Patented Nov. 28, 1922.

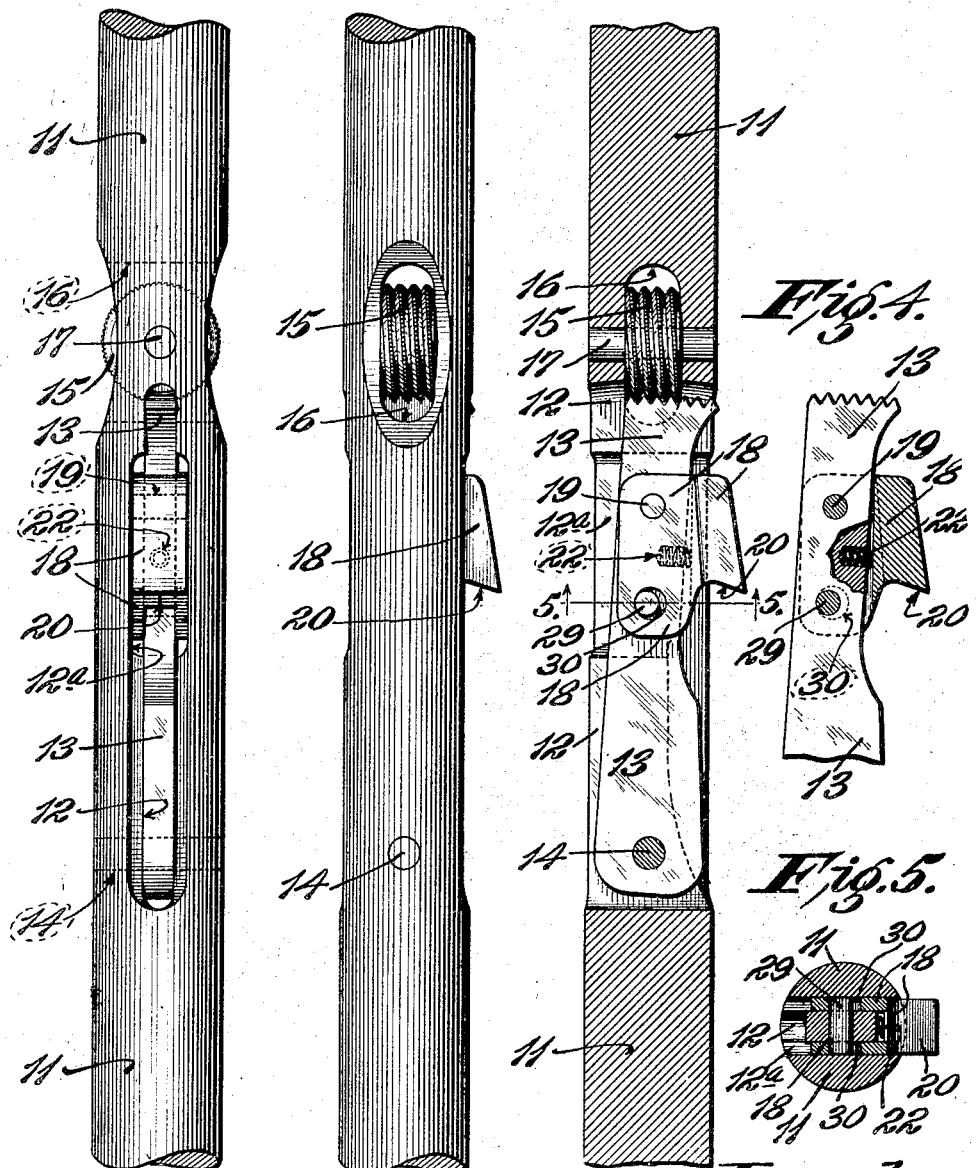

1,436,826

UNITED STATES PATENT OFFICE.

WILLIAM F. SCHMIDT, OF ST. LOUIS, MISSOURI.

KEYWAY-SLOTTING DEVICE.

Application filed March 2, 1921. Serial No. 449,159.

*To all whom it may concern:*

Be it known that I, WILLIAM F. SCHMIDT, a citizen of the United States, and a resident of the city of St. Louis and State of Missouri, have invented a new and useful Improvement in Keyway-Slotting Devices, of which the following is a specification.

This invention relates principally to keyway slotting devices and is an improvement in the type of slotting device shown in my Patent No. 1,210,544, dated January 2, 1917, wherein the cutter is pivotally supported on a flat cutter holder adjustably mounted in a bar which is adapted to be held in the longitudinally movable spindle of a press or other machine. Such devices are well adapted to cutting keyways in cast iron or other soft metal. However, in cutting keyways in hard metal, such as tool steel or machine steel, there is a tendency, due to the resistance offered by the hard metal, for the flat cutter holder, to spring or bow outwardly and cause the cutter to dig deeply into the metal, thereby causing the cutter to jam and necessitate the starting of a new cut and the readjustment of the cutter holder. Apparently, this outward bowing of the cutter holder is caused by the cutter being forced by the work against the shoulder of the cutter holder, which action, by reason of the cutter holder being rigidly held at both ends, tends to force the cutter pivot outwardly, thereby straining the cutter holder and causing the same to bow outwardly between its ends.

The principal object of the present invention is to overcome the above mentioned disadvantages associated with the use of the above type of cutting device in cutting slots in hard metal. The invention consists principally in the improved cutter and in the manner of mounting the same on the cutter holder; and it also consists in the parts and arrangements of parts hereinafter described and claimed.

In the accompanying drawing, which forms part of this specification, and wherein like symbols refer to like parts wherever they occur;

Fig. 1 is a face view of a cutter bar and cutter embodying the invention;

Fig. 2 is a side view of the same;

Fig. 3 is a longitudinal section of the same on the principal axis of the cutter bar, showing the cutter support, cutter, and adjusting screw in side elevation;

Fig. 4 is a side view of a portion of the cutter support and cutter, parts being broken away to disclose the detail construction; and Fig. 5 is a cross-section of the device on the line 5—5 on Fig. 3.

The ends of a supporting bar 11 are not shown in the drawings, but they may be suitably formed for holding the bar in a chuck or socket of the tool spindle of a drill press, broaching or slotting machine, or center spindle of an arbor press or tail stock of a lathe, or in the tool post or other clamping device on the lathe carriage, the essential thing being that the bar shall be mounted for movement lengthwise with respect to the work. The middle of the bar is arranged in axial alinement with the hub of the gear or pulley to be slotted, and the free end of the bar may be guided in a bushing or other suitable device secured to the frame or to the work table of the machine.

The bar 11 has a long narrow slot or groove formed in it lengthwise at its middle, the side walls 12 of the slot being parallel to each other and spaced at equal distances from the axis of the bar. Fitting in this slot is a flat cutter holder 13, one end of which is pivoted to the bar by a transverse pin 14, permitting movement of the other end of the cutter toward and away from the axis of the bar. The movable end of cutter holder is curved to conform to an arc of a circle having the pin 14 for a center, and is provided with transverse notches or teeth which engage with a knurled adjusting screw 15 arranged cross-wise of the bar in a slot 16. The slot 16 extends through the bar at right angles to the end of the slot 12. The screw is mounted for rotation on a pin 17 which extends through the bar across the middle of the slot 16. The sides of the bar, near the ends of the slot 16 are recessed to permit the screw 15 to be rotated by the thumb and finger.

A cutter 18 is pivotally mounted on the cutter edge of the cutter support 13 and is held in place by a pivot pin 19 which is located near the movable end of the cutter support. The cutting face 20 of the cutter projects from the slot 12 on one side of the lever, said slot being widened near its end, as at 12ª, to accommodate said cutter. The outer edge of the cutter is sloped back from the cutting edge, and said cutter is bifurcated along its inner edge, forming a channel shaped portion which straddles the outer edge of the cutter support. The pivot pin 19 passes through the registering holes in the spaced cutter support and in the two spaced side flanges of the cutter near one end thereof and is held in place by the side walls of the widened portion 12ᵃ of the slot 12.

A second pin 29 extends through the cutter support near the opposite end of the cutter and its ends engage holes 30 in the spaced side flanges of the cutter 18, which holes are of larger diameter than the diameter of the pin 29. A spiral compression spring 22 is seated in a hole in the front edge of the cutter with its outer end bearing against the web of the channel shaped portion of the cutter, whereby the cutter is maintained normally with its cutting edge as far away from the cutter holder as the holes 30 will permit, with the base or web portion of the channeled portion thereof clear of the forward edge of the cutter holder. In the operation of the device, the spring 22 permits the cutting edge of the cutter to swing inwardly away from the work sufficiently to relieve it during the return strokes.

During the cutting stroke, the pressure of the work is transmitted to the pivot pin and tends to rotate the cutter about said pin. This action tends to swing the opposite end of the cutter outwardly, causing the portion of the flanges at the rear of the holes 30 of the cutter to bear against the rear sides of said pin. Thus, the pressure of the work, instead of forcing the cutter support outwardly between its opposite ends and causing the cutter to dig too deeply into the work, is resolved into a force tending to bend the cutter support inwardly between its upper end and the stop pin and a second force tending to bend the cutter support outwardly between the pivot pin and the lower end of said support; and these contrary tendencies substantially neutralize each other and leave the cutter unbent, thereby adapting the device for use in slotting hard metals.

The device is adapted for attachment to machines having either vertically or horizontally reciprocating spindles. In cutting slots, the cutter bar is reciprocated back and forth, and prior to each cutting stroke the cutter is fed outwardly slightly by rotating the knurled screw 15. The ends of the pivot pin 19 and the stop pin 29 are not riveted over, and the cutter 18 can be easily dismounted by driving out the pins 19 and 29. Endwise movement of said pins is prevented by the sides of the enlarged portion 12ᵃ of the slot 12, and said pins are adapted to be removed by screwing the adjusting screw off the end of the cutter support and swinging the latter out of the slot.

Obviously, the device admits of considerable modification without departing from the invention; therefore, I do not wish to be limited to the exact details of construction shown and described.

What I claim is:

1. In a slotting device comprising a bar and a cutter mounted therein, one end of said cutter being pivotally mounted in said bar to permit the other end to swing transversely thereof, means located in said bar engaging the free end portion of said cutter for limiting its pivotal movement.

2. In a slotting device comprising a bar and a cutter mounted therein, one end of said cutter being pivoted to permit the other end to swing transversely of said bar, the free end portion of said cutter having an opening therein, and means located in said bar and extending into said opening, said means being smaller than said opening and constituting a stop for limiting the pivotal movement of said cutter.

3. In a slotting device comprising a bar, a cutter holder adjustably mounted in said bar, and a cutter mounted on said holder, one end of said cutter being pivoted to said holder to permit the other end to swing transversely thereof, said holder having a member engaging the free end portion of said cutter for limiting its pivotal movement.

4. In a slotting device comprising a bar having an elongated longitudinal opening in its side, a cutter holder disposed lengthwise in said opening and arranged for movement crosswise thereof, and a cutter mounted on said holder, one end of said cutter being pivoted to said support to permit the other end to swing transversely thereof, said holder having portions engaging the free end portion of said cutter for limiting its pivotal movement.

5. In a slotting device comprising a bar, a cutter holder adjustably mounted in said bar, and a cutter mounted on said holder, one end of said cutter being pivoted to said holder to permit the other end to swing transversely thereof and the other end of said holder having an opening formed therein, and a pin extending through said holder and the opening in the free end of said cutter, said pin being smaller than said opening and constituting a stop for limiting the pivotal movement of said cutter.

6. In a slotting device comprising a bar, a cutter holder adjustably mounted in said bar, a cutter channeled along its inner edge to straddle the outer edge of said cutter holder, one end of said cutter being pivoted to said holder to permit the other end to swing transversely thereof, the free end of said cutter and said other end having oppositely disposed openings formed in the spaced side flanges of its channeled portion, and a pin extending through said cutter holder and the openings in said cutter, said pin being smaller than said openings and constituting a stop for limiting the pivotal movement of said cutter.

7. In a slotting device comprising a bar having an elongated longitudinal opening in its side, a cutter holder disposed lengthwise in said opening and arranged for movement crosswise thereof, a cutter channeled along its inner edge to straddle the outer edge of said holder, one end of said cutter being pivoted to said holder to permit the other end to swing transversely thereof, the free end of said cutter having oppositely disposed openings formed in the spaced side flanges of its channeled portion, and a pin extending through said cutter holder and the openings in said cutter, said pin being smaller than said openings and constituting a stop for limiting the pivotal movement of said cutter.

Signed at St. Louis, Missouri, this 28th day of February, 1921.

WILLIAM F. SCHMIDT.